United States Patent [19]

Legg et al.

[11] Patent Number: 5,066,531
[45] Date of Patent: Nov. 19, 1991

[54] VARIABLE THICKNESS FOAM PLANK

[75] Inventors: Warren F. Legg, Worthington; Wilfred E. Willis, Grayson, both of Ky.

[73] Assignee: Ametek, New York, N.Y.

[21] Appl. No.: 403,121

[22] Filed: Sep. 5, 1989

[51] Int. Cl.[5] .................. B32B 3/10; B32B 3/24; B32B 31/00
[52] U.S. Cl. ............................. 428/131; 156/251; 156/253; 264/154; 264/321; 428/137; 428/198; 428/316.6
[58] Field of Search ............... 156/252, 290, 308.4, 156/309.6, 250, 251, 253; 428/131, 134, 135, 136, 137, 198, 316.6, 138; 264/154, 321

[56] References Cited

U.S. PATENT DOCUMENTS

| | | | |
|---|---|---|---|
| 2,878,153 | 3/1959 | Hacklander | 428/316.6 |
| 3,384,696 | 5/1968 | Makansi | 428/131 |
| 3,719,736 | 3/1973 | Woodruff | 264/156 |
| 3,734,811 | 5/1973 | Small et al. | 428/316.6 |
| 3,867,240 | 2/1975 | Doerfling | 428/316.6 |
| 4,021,291 | 5/1977 | Joice | 156/513 |
| 4,086,384 | 4/1978 | Adelman et al. | 428/213 |
| 4,121,960 | 10/1978 | Focht | 156/219 |
| 4,185,402 | 1/1980 | Digate | 36/44 |
| 4,257,176 | 3/1981 | Hartung et al. | 36/44 |
| 4,263,360 | 4/1981 | Adelman | 428/238 |
| 4,432,822 | 2/1984 | Adams et al. | 156/148 |
| 4,575,471 | 3/1986 | Wong | 428/137 |
| 4,642,912 | 2/1987 | Wildman et al. | 36/44 |
| 4,657,610 | 4/1987 | Komatsu et al. | 156/87 |
| 4,726,987 | 2/1988 | Trask et al. | 428/282 |
| 4,758,297 | 7/1988 | Calligarich | 428/137 |
| 4,780,359 | 10/1988 | Trask et al. | 428/234 |

*Primary Examiner*—William J. Van Balen
*Attorney, Agent, or Firm*—Ratner & Prestia

[57] ABSTRACT

A process for hot pin perforation bonding of a plurality of lamina of thermoplastic foam sheet material to produce a controllably rigid, strong, lightweight and easily shaped cushioned foam plank; and a product as formed in that process.

12 Claims, 1 Drawing Sheet

VARIABLE THICKNESS FOAM PLANK

BACKGROUND OF THE INVENTION

1. Field of the Invention

This invention relates to a thick and controllably rigidified thermoplastic foam product and a method of manufacture thereof.

2. Description of Prior Art

Hot pin perforation bonding is used in the present invention. This bonding technique is shown in U.S. Pat. No. 4,758,297 - Calligarich, which discloses a method of using hot pin perforation bonding to laminate one ply of thermoplastic film to one ply of cellular fiber fabric. The process described therein is a continuous one using a heated roller with projecting pins.

Hot pin bonding has been used for many years in a commercial product by Ametek, Inc., the Assignee of the present invention, to produce a thin multi-layer flexible polypropylene foam sheet material.

In this case, the resultant product retains the flexibility of the original starting material sheets, and the pins generally do not fully perforate the material. Occasionally the hot pins may cause perforations in the sheet material. These perforations may be formed intentionally, to provide ventilation, or unintentionally due to overheated pins. Still, this product in all known forms is very flexible and relatively thin (less than one-half inch thick).

Thermoplastic (e.g. polyethylene and polypropylene) foam has been made by extruding or otherwise molding a sheet of resin, in which is incorporated a dispersed blowing agent. Upon decompression, as it leaves the extrusion die for example, the blowing agent expands and escapes as the resin solidifies. A foam product, ideally of flexible, micro-cellular structure, results. If the resin sheet is too thick, however, the blowing and hardening reactions are not coordinated and an unfoamed or poorly foamed product results.

SUMMARY OF THE INVENTION

The product of this invention is a thick, soft thermoplastic foam sheet material, or "plank" of controlled (or controllably pre-determined) rigidity. The term "plank" as used here refers to a generally flat product, usually of indefinite length and with a thickness in a range from one half to several (generally no more than five) inches. This plank comprises a plurality of thin flexible lamina, preferably of microcellular polypropylene foam, held together and made rigid by melt-bonded perforations.

In accordance with the method of manufacture of the present invention, a plurality of continuous webs of thermoplastic foam material, preferably microcellular polypropylene, are simultaneously fed, either in discrete lengths or indefinite lengths, from supply rolls to a forming table where they overlay one another. Successive lengths of material are compressed, then perforated with hot pins, which cause localized melting through the thickness of the resulting laminate. After the hot pins are removed, and locally melted areas cooled, the laminate product is released from compression and another length is brought onto the forming table. In this way, a continuous hot pin bonded foam plank is produced. The plank is then cut to any desired length by conventional means.

The face of the resultant product is relatively soft, while the laminated product, in general, is relatively rigid, to a degree dependent on the temperature, size and spacing of the pins and the compression exerted on the material during the hot pin perforation process.

DETAILED DESCRIPTION OF THE PREFERRED EMBODIMENT

Figure 1:
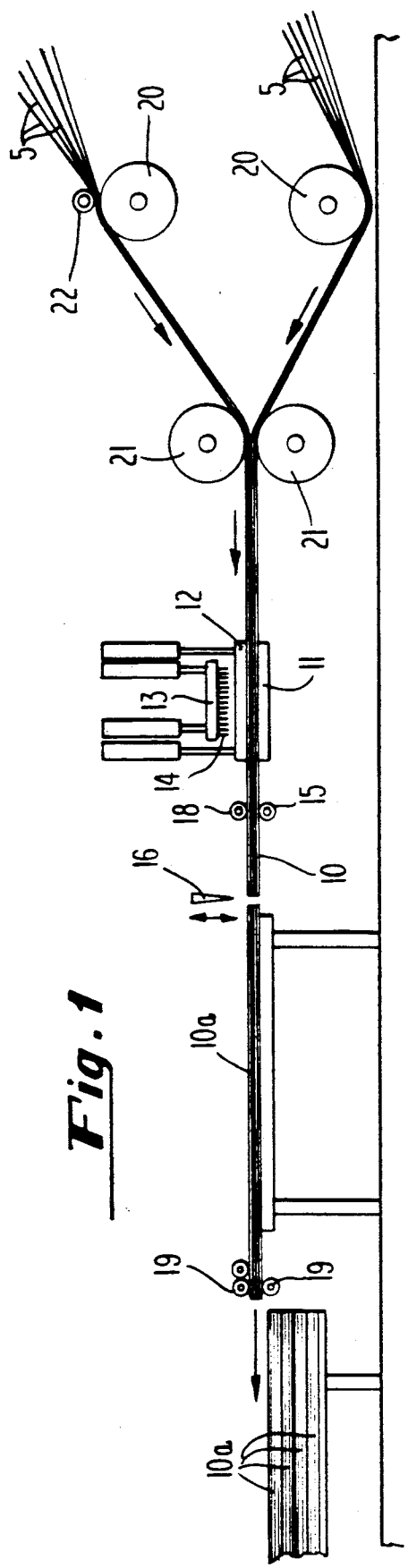
FIG. 1 is a schematic view of the process of the present invention.

Referring to FIG. 1, individual webs 5, of thermoplastic foam, preferably microcellular polypropylene such as that sold by Ametek as Microfoam, and typically from about one-thirty-second to one-eighth inch thick, are used as feed. Feed webs 5 may be up to 78 inches wide. These webs are supplied from supply rolls, not shown. Preferably, the ends of the rolled webs are staggered so that the breaks in the webs which occur at the ends of the rolls are also staggered. Therefore, one continuous plank of foamed material is produced with occasional breaks in individual layers. Feed webs 5 are directed to the forming table of a hot pin perforating apparatus by nip roller 22 and feed rollers 20. Feed webs 5 are then passed through precompression nip rollers 21. Throughout the process, the feed webs move intermittently. The process is a batch process performed on continuous webs of feed material.

Successive predetermined lengths of feed webs are moved and held in position, overlying one another on fixed platen 11 of the forming table. Compression platen 12 is then lowered over feed webs 5. Compression platen 12 compresses the thermoplastic foam feed webs 5, while hot pin platen 13 is lowered toward the feed webs. Compression platen 12 (and preferably fixed platen 11 also) is equipped with holes to allow hot pins 14 to penetrate through feed webs 5. As hot pin platen 13 is lowered, hot pins 14 penetrate the thermoplastic foam webs 5, melting holes through the thermoplastic foam webs. The melted material lines the holes thus produced and bonds feed webs 5 together into a continuous foam plank 10. Hot pin platen 13 is then withdrawn, and the thermoplastic material is allowed to cool briefly. Compression platen 12 is then lifted and predetermined length of feed webs 5 is moved and held in position on fixed platen 11, so that the next section may be bonded.

The resultant continuous foam plank 10 is taken away by drive roller 15 and nip roller 18. Drive roller 15 may drive the entire system of feed webs 5. When a predetermined length of continuous foam plank 10 has been produced, it is cut by cutter 16 into individual planks 10a. Cutter 16 may be a knife blade, heated wire or any other conventional means used for cutting thermoplastic foam material. Foam planks 10a may then be removed by take-away rollers 19 and stacked and shipped to their destination.

Figure 2:
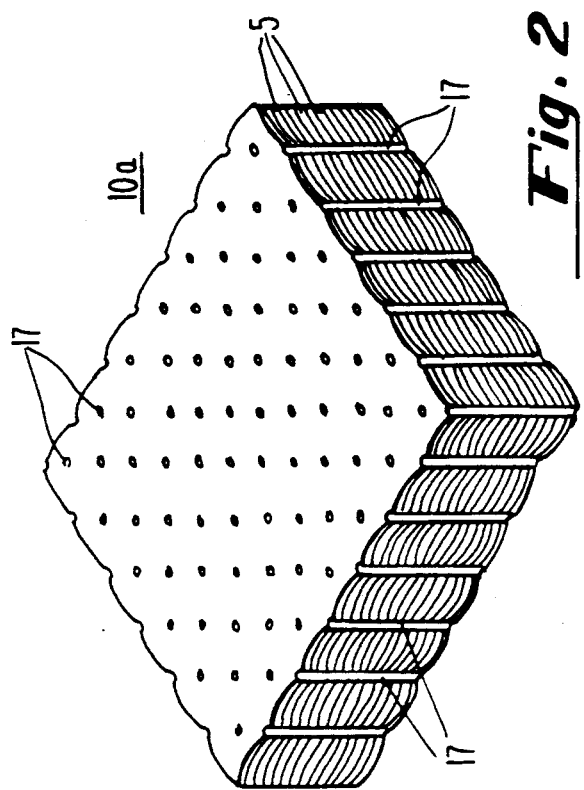
FIG. 2 is a cross-sectional perspective view of the product of the present invention.

One resultant foam plank product 10a is shown in FIG. 2. Upon release of compression by compression platen 12, the material between holes 17 (caused by hot pins 14) expands slightly and a quilted effect is achieved. The plank experiences residual compression in the vicinity of the holes, that is webs 5 remain compressed as compared to their non-bonded state. The resultant foam planks 10a are very strong and lightweight. They can also be extremely non-abrasive. depending upon the material from which they were made. They will have nearly the same non-abrasive qualities as feed webs 5. Foam planks 10a are rigid and relatively inflexible, in contrast to feed webs 5. This rigidity is believed to result, at least in part, from the pre-bonding compression of foam webs 5. This rigidity is controllable. The rigidity and density of the plank vary with the amount of compression used. Density is further variable through selection of the starting feed webs. Thicker feed webs tend to be less dense than thinner webs (i.e. one-eighth inch thick webs are less dense than one-thirty-second inch thick webs). Therefore, thicker feed webs result in a plank with a lower density than if thinner feed webs are used.

The rigidity also depends on the size and spacing of the hot pins; the amount of compression force used; the thickness of the foam web starting material; and the overall thickness of the plank, as well as the flexibility/compressibility characteristics of the starting material.

In the preferred embodiment of this invention, the resultant product is between ⅛ and 5 inches thick, and is comprised of between 5 and 150 sheets of 1/32 to ⅛ inch thickness and up to 78 inches width each. The compression used in producing the laminate is preferably 5 to 15 psi. Hot pins of between 3/16 and 5/16 inch diameter and length sufficient to penetrate all of the individual sheets (at least 5 inches) are used at a spacing of about 1 inch, or 1 pin per square inch and a temperature of between 400° F. and 500° F., to produce a plank having a density of from 0.5 lb/ft$^3$ to 1.5 lb/ft$^3$.

The resultant material, foam planks 10a, may be easily cut and shaped using knives, heated wires, or any known method for cutting thermoplastic material. The planks may also be trimmed to approximately 72 inches in width from the 78 inch wide starting material. Foam planks 10a are durable and lightweight and therefore useful for shipping fragile materials. The planks may be coated, for instance with anti-static coating, or alternatively, may be produced from feed webs which contain anti-static treatment, if the product which they are to protect so requires.

The invention has been described as the method of manufacturing a multi-ply laminate and the product of such manufacture in the best mode known to the applicants. However, it will be apparent that the invention may be varied in many ways. Such variations are not to be regarded as a departure from the spirit and scope of the appended claims.

I claim:

1. A relatively and controllably rigid, lightweight flat thermoplastic foam product comprising:
   a plurality of laminated thermoplastic foam sheets bonded to one another by melt-bound perforations.

2. The product of claim 1 wherein said thermoplastic sheets are hot pin perforation bonded.

3. The product of claim 1 wherein said thermoplastic is polypropylene.

4. The product of claim 2 wherein said thermoplastic is microcellular polypropylene.

5. The product of claim 1 wherein said thermoplastic is polyethylene.

6. The product of claim 2 wherein said thermoplastic is polyethylene.

7. A relatively and controllably rigid flat foamed thermoplastic product comprising:
   a laminate of a plurality of foamed thermoplastic sheets, said sheets bonded to one another by non-foamed material lining holes through said sheets.

8. The product of claim 7 wherein said sheets are hot pin perforation bonded.

9. The product of claim 7 wherein said thermoplastic is polypropylene.

10. The product of claim 7 wherein said thermoplastic is polyethylene.

11. The product of claim 8 having residual compressive forces among said sheets.

12. A method for making a rigid flat foamed thermoplastic product comprising the steps of:
    bringing into laminated relationship at least a portion of each of a plurality of continuous webs of foamed thermoplastic material;
    compressing said portions in a direction, perpendicular to the length and width of said sheets, and parallel to the thickness of said sheets;
    bonding said portions to one another by forming melt-surrounded perforations therethrough; and
    releasing said portions from compression.

* * * * *